United States Patent [19]
Rappaport

[11] Patent Number: 5,785,331
[45] Date of Patent: Jul. 28, 1998

[54] DUAL-FOOTBOARD SCOOTER

[76] Inventor: Mark Rappaport, 2244 Carmel Valley Rd., Del Mar, Calif. 92014

[21] Appl. No.: 593,437

[22] Filed: Jan. 29, 1996

[51] Int. Cl.$^6$ .................................................. B62M 1/00
[52] U.S. Cl. ........................................................ 280/87.041
[58] Field of Search ........................ 280/87.01, 87.021, 280/87.03, 87.041, 87.042, 11.2, 220

[56] References Cited

U.S. PATENT DOCUMENTS

| | | | |
|---|---|---|---|
| 899,963 | 9/1908 | Ferguson | 280/11.2 |
| 982,846 | 1/1911 | Nesbitt, Sr. | 280/11.2 |
| 1,530,165 | 3/1925 | Fowler | 280/87.042 |
| 1,617,357 | 2/1927 | Walter | 280/87.041 |
| 1,678,836 | 7/1928 | Wessborg | 280/87.01 |
| 2,077,274 | 4/1937 | Silkman | 280/87.041 |
| 4,047,732 | 9/1977 | Williams et al. | 280/220 |
| 4,071,261 | 1/1978 | Winchell | 280/220 |
| 4,123,079 | 10/1978 | Biskup | 280/87.042 |
| 4,552,372 | 11/1985 | Jones | 280/87.041 |
| 4,776,604 | 10/1988 | Valdez et al. | 280/87.041 |
| 5,013,032 | 5/1991 | Baum et al. | 280/87.021 |
| 5,039,121 | 8/1991 | Holter | 280/87.041 |
| 5,620,189 | 4/1997 | Hinderhofer | 280/87.041 |

FOREIGN PATENT DOCUMENTS

| | | | |
|---|---|---|---|
| 47723 | 5/1911 | Austria | 280/87.041 |
| 910208 | 4/1954 | Germany | 280/87.021 |

Primary Examiner—Brian L. Johnson
Assistant Examiner—Frank Vanaman
Attorney, Agent, or Firm—Michael Ebert

[57] ABSTRACT

A dual-footboard scooter in a tricycle format, the front wheel of the scooter being coupled to a steering post passing through a steering column to join a steering handle provided with a hand brake operatively coupled to the front wheel. A pair of parallel footboards are attached at their front ends to a bifurcated frame extending rearwardly from the steering column. Secured to the underside of each footboard is a rear end wheel behind which is a skid brake adapted to engage the ground only when the footboard is upwardly tilted. In operating the scooter, the rider grasps the steering handle, one foot then resting on either one of the footboards, the other foot extending through the space between the footboards to make pushing contact with the ground to propel the scooter forward. Should the scooter jump in the course of travel and in doing so raise the front wheel above ground and cause the footboards to become upwardly inclined, the scooter then seeks to swing backward about the rear wheels and thereby endanger the rider. The action is avoided by the rear skid brakes which then engage the ground to cause the scooter to swing forward to return the front wheel to the ground.

8 Claims, 2 Drawing Sheets

DUAL-FOOTBOARD SCOOTER

BACKGROUND OF INVENTION

1. Field of Invention

This invention relates generally to foot-propelled vehicles, and more particularly to a dual-footboard scooter in a tricycle format.

2. Status of Prior Art

A standard scooter is a child's vehicle consisting of a long footboard supported by front and rear end wheels and controlled by an upright steering post coupled to the front wheel and provided with a steering handle. A child riding the scooter grasps the handle, with one foot resting on the footboard. The child puts the scooter in motion by means of his other foot which makes pushing contact with the road on one side of the footboard.

A single footboard scooter is a somewhat hazardous vehicle in the hands of an inexperienced child, for like a two-wheel bicycle, the scooter is inherently unstable. Unless the scooter is in motion and the child balances his weight on the footboard, the scooter will tip to one side and throw the rider. Or should the scooter jump in the course of travel and the front wheel becomes raised above the ground, the scooter may then swing backward about the rear wheel and throw the rider.

Far more stable and controllable than a scooter is a conventional tricycle which has a front wheel to which a steering handle is coupled through a steering post, and a pair of rear wheels above which is a seat to accommodate the child. The feet of the seated child engage pedals mounted on the axle of the front wheel.

But a tricycle is a relatively tame vehicle, for its pedal operation does not permit the tricycle to go very fast.

The advantage of a scooter is that it can not only be propelled to travel at high speed, but one can also execute various maneuvers with a scooter, such as jumping over steps to go from a raised to a lower road surface. However, with a conventional single footboard scooter, risks are entailed in executing daring tricks.

Inasmuch as a scooter in accordance with the invention is in a tricycle format, of prior art interest is the Powell patent 2,597,748. The walking and riding vehicle of Powell is provided with a V-shaped tubular metal frame on whose diverging legs are mounted rear end wheels. A front wheel controlled by a steering handle is supported below the apex of the frame. The child grasping the handle can walk the Powell vehicle by walking between the legs, or the vehicle can be used for coasting by standing on foot rest plates attached to the diverging legs.

The tri-skater shown in the Holter patent 5,039,121 has a V-shaped frame on which footboards are mounted, rear skate casters being coupled to the rear of the footboards. A handle-controlled front wheel is coupled to the apex of the frame. The Holter vehicle is propelled by a rider who grasps the handle and stands on the footboards, the rider shifting his weight alternately from side to side as if he were ice skating.

The three-wheeled scooter type vehicle disclosed in the Shelton patent 4,540,192 is forwardly propelled by body movement of the rider by means of two rearwardly extending foot support frames pivotally connected to a front steering column. The foot support frames are provided with caster wheels which are yieldably tensioned to propel the vehicle in a direction of forward travel when the foot support frames are laterally moved.

Disclosed in the Winchell patents 4,071,261, 4,076,270 and 4,088,338, in the Biskup patent 4,165,093 and in the Williams patent 4,047,732 are three-wheeled cambering vehicles. In these cambering vehicles, foot rests are provided in a V-formation, the vehicle being propelled by the rider shifting his weight in a timed sequence from one foot to the other.

SUMMARY OF INVENTION

In view of the foregoing, the main object of this invention is to provide a dual-footboard scooter in a tricycle format which is propelled by a rider who rests one foot on either footboard while employing the other foot in the space between the footboards to make pushing contact with the ground.

Among the significant features of a dual-footboard scooter in accordance with the invention are the following:

A. the scooter has the inherent stability of a tricycle, yet is more maneuverable and is capable of being propelled to travel at a much faster speed;

B. the scooter can easily be braked to slow down or arrest its movement;

C. the scooter is safe to operate, for should the scooter jump in the course of travel, it will not be permitted to swing backward on its rear wheels and throw the rider;

D. the scooter is of simple design and can therefore be mass produced at low cost, using for this purpose standard tricycle and roller skate components.

Briefly stated, these objects are attained by a dual-footboard scooter in a tricycle format, the front wheel of the scooter being mounted under a steering post passing through a steering column to join a steering handle provided with a hand brake operatively coupled to the front wheel. A pair of parallel footboards are attached at their front ends to a bifurcated frame extending rearwardly from the steering column. Secured to the underside of each footboard is a rear end wheel behind which is a skid brake adapted to engage the ground only when the footboard is upwardly tilted.

In operating the scooter, the rider grasps the steering handle, one foot then resting on either one of the footboards, the other foot extending through the space between the footboards to make pushing contact with the ground to propel the scooter forward. Should the scooter jump in the course of travel and in doing so raise the front wheel above ground and cause the footboards to become upwardly inclined, the scooter then seeks to swing backward about the rear wheels and thereby endanger the rider. This action is avoided by the rear skid brakes which then engage the ground to cause the scooter to swing forward to return the front wheel to the ground.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
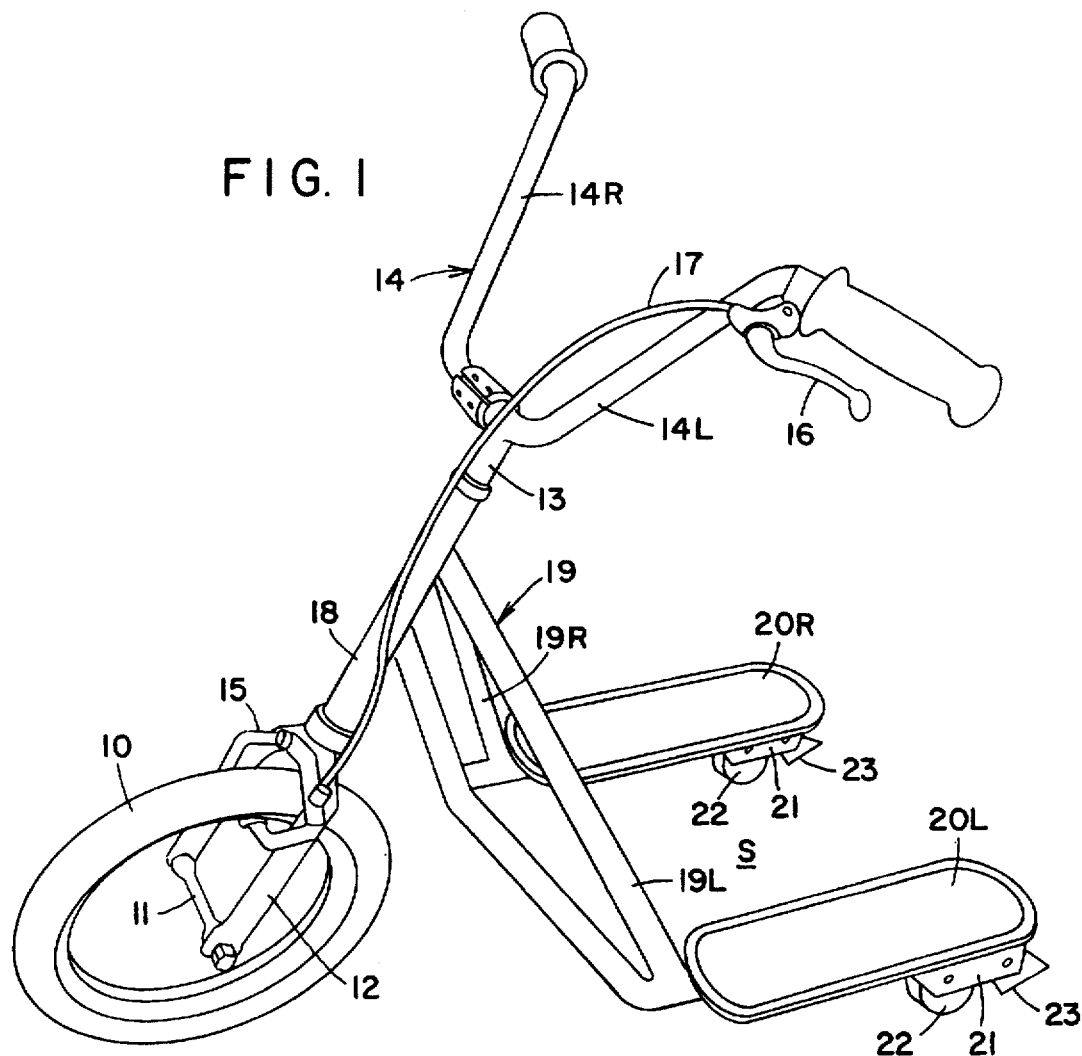
FIG. 1 is a perspective view of a dual-footboard scooter in accordance with the invention.

Scooter Structure:

Referring now to FIG. 1, there is shown a dual-footboard scooter in a tricycle format in accordance with the invention, the scooter including a front wheel 10. Wheel 10 may be a conventional 10 to 16 inch tire-rimmed tricycle wheel mounted on an axle 11.

Coupled to axle 11 of the front wheel 10 by a fork 12 is an upright steering post 13 whose upper end is joined to a steering handle 14 provided with right and left hand bars 14R and 14L. The rim of front wheel 10 is engagable by a clamp-type brake 15 which is controllable by a hand lever 16 mounted on the left hand bar 14L of the handle. Lever 16 is operatively coupled to brake 15 by a cable 17. Steering post 13 extends through a steering column 18, the post being rotatable within the column. The front wheel, the steering post, the steering column and the front wheel brake may be the same as those included in a standard tricycle and are therefore readily available.

Figure 2:
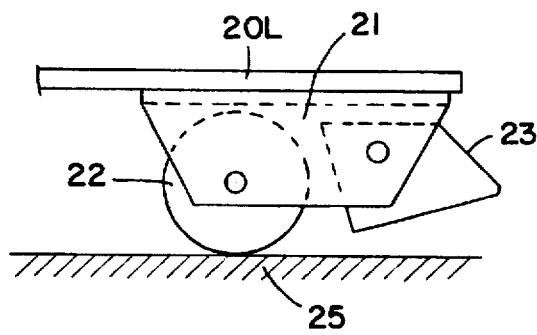
FIG. 2 shows the rear portion of one of the footboards on which is mounted a rear skate wheel behind which is a skid brake.

Welded to steering column 18 and extending rearwardly therefrom is a bifurcated rigid frame having right and left branches 19R and 19L. Attached to frame branch 19R is the front end of an elongated right footboard 20R, and attached to the frame branch 19L is the front end of a left footboard 20L. Secured to the underside of each footboard, as best seen in FIG. 2, is a bearing bracket 21 which supports a skate wheel 22. Wheel 22 is preferably of the type used in roller skates, the wheel being molded of high strength polyurethane or other synthetic plastic material.

Figure 3:
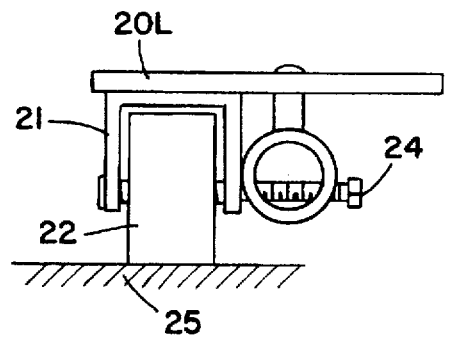
FIG. 3 illustrates the mounting for a rear skate wheel.

As best seen in FIG. 3, skate wheel 22 is mounted on a retractable axle 24 so that when the wheel is worn or damaged, it may then readily be replaced by a fresh wheel.

Also mounted on bracket 21 behind wheel 22 is a skid brake 23 which also may be of the type found in in-line roller skates. The skid brake is preferably formed of rubber or a synthetic plastic material such as polyethelene have a high coefficient of sliding friction.

The two parallel footboards 10 and 11 are widely spaced from each other to define therebetween a free space S. Thus when a rider has one foot on either footboard he, may then extend his other foot through space S to engage the ground with a pushing motion to propel the scooter forward.

Scooter Operation:

To operate the dual-footboard scooter, the rider when the scooter is coasting grasps the handle with both hands and rests his right and left feet on footboards 20R and 20L. As the rider coasts he can steer by turning the front wheel.

In order to propel the scooter in the forward direction, the rider while resting one foot on either footboard, uses his other foot to make pushing contact with the road surface, this foot going into free space S between the footboards. Should the rider wish to slow down and arrest forward motion of the scooter, he has only to operate the hand controlled front wheel brake for this purpose. Because of the catamaran structure of the dual-footboard scooter, it is highly stable and will not tip to one side. Hence the scooter affords a measure of safety in this regard, even to an altogether in-experienced rider.

In normal operation, skid brakes 23 on the rear end of both footboards are raised above the road surface 25 as shown in FIG. 2, just as they would be in conventional in-line roller skates. Hence the rear skate wheels 22 are then free to turn.

Figure 4:
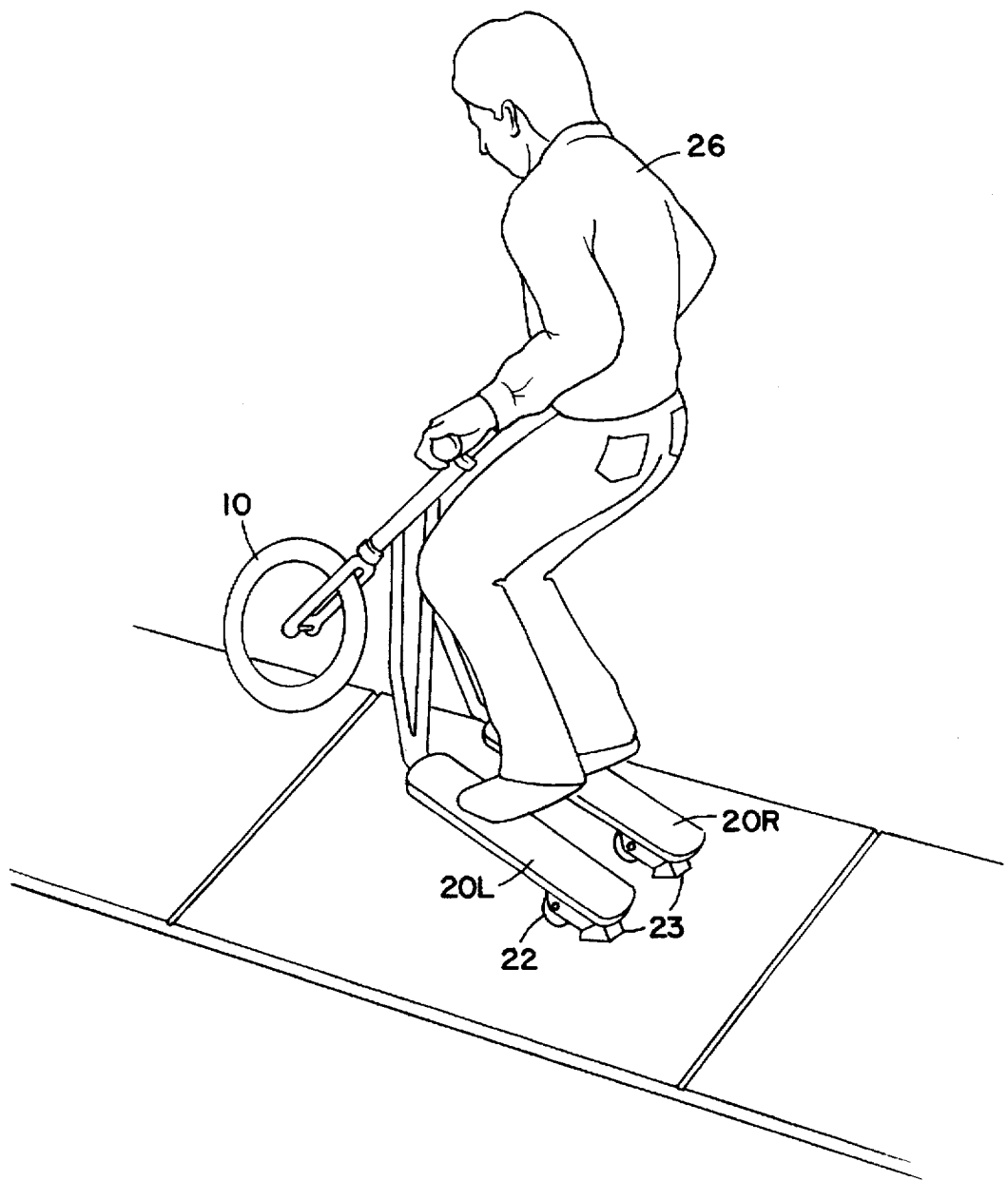
FIG. 4 shows a rider on the scooter when the scooter is upwardly tilted.

In the course of scooter travel, the scooter may be caused to jump, as when leaping over a step from a raised to a lower road surface, as shown in FIG. 4, which shows a rider 26 grasping the handle of the scooter. When the scooter jumps, footboards 20R and 20L are then tilted upwardly and front wheel 10 is then raised above the road surface. As a consequence, the scooter now seeks to swing backward about rear skate wheels 22, particularly since the rider now leans backward.

Figure 5:
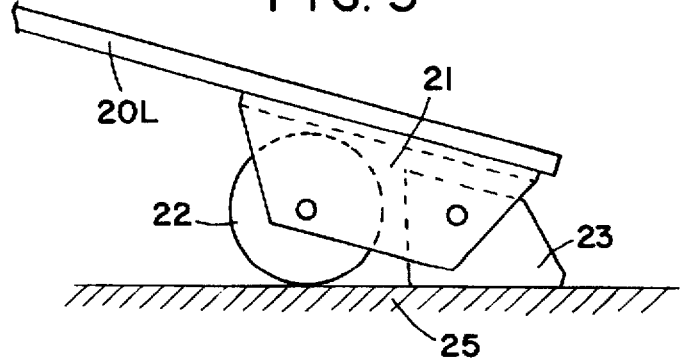
FIG. 5 illustrates the relation of a rear skate wheel to the ground when the footboard on which it is mounted is upwardly tilted.

However, the upward tilt of the footboards, as shown in FIG. 5, causes skid brakes 23 to engage and skid along ground surface 25 and thereby brake the rear wheels. This forces the scooter to swing forward and in doing so to return front wheel 10 to the ground. When this happens the skid brakes are again disengaged from the ground and the scooter is permitted to continue its forward travel.

Hence the rear skid brakes perform an important safety function, for they prevent the scooter from throwing off and possibly injuring the rider. In a vehicle in accordance with the invention, normal braking is effected by the front wheel brake, not by the rear skid brakes which only come into play momentarily when the scooter is upwardly tilted as a result of a maneuver executed by the rider, for only then do the skid brakes make brief contact with the ground.

Thus the skid brakes do not in the manner of an in-line roller skate effect a braking action but only serve to return the front wheel to the ground surface so that the scooter can continue to travel in the forward direction.

While there has been show and described a preferred embodiment of a duble-footboard scooter in accordance with the invention, it will be appreciated that many changes and modifications may be made therein without, however, departing from the essential spirit thereof.

I claim:

1. A foot-propelled dual footboard scooter in a tricycle format, said scooter comprising:

A. a front wheel having an axle coupled by a fork to an upright steering post passing through a steering column to join a steering handle provided with a hand brake operatively coupled to the front wheel whereby a rider grasping the steering handle can steer and brake the scooter;

B. a rigid frame extending rearwardly from the steering column;

C. a pair of parallel footboards attached at their front ends to the frame to define a free space in front of and between the parallel footboards having a width sufficient to accommodate a foot of the rider to make pushing contact with a road surface to propel the scooter, the other foot of the rider resting on either of said footboards; and D. a rear end wheel mounted on the underside of each footboard whereby the scooter normally runs on three wheels, said frame extending from the steering column being bifurcated to define separate branches to which the front ends of the footboards are attached, said branches having a free space therebetween which merges with the free space between the parallel footboards to provide an extended free space whereby regardless of where the rider stands with one foot on either footboard, he is provided with an extended free space between the footboards in which to swing his other foot to propel the scooter.

2. A scooter as set forth in claim 1, further including a skid brake mounted on the underside of each footboard behind the rear wheel and adapted to engage the road surface only when the footboard is upwardly tilted.

3. A scooter as set forth in claim 2, in which the skid brake is formed of a synthetic plastic material having a high coefficient of sliding friction.

4. A scooter as set forth in claim 2, in which the rear wheel is a roller skate wheel.

5. A scooter as set forth in claim 4, in which the skate wheel and the skid brake are both supported on a bracket secured to the underside of the footboard.

6. A scooter as set forth in claim 1, in which the rear end wheel is supported on a retractable axle to facilitate its replacement.

7. A scooter as set forth in claim 1, in which said hand brake is engageable with a rim of said front wheel, and said handle is provided with a lever coupled by a cable to the hand brake whereby when the lever is operated, the hand brake engages the front wheel.

8. A foot propelled scooter comprising:

A. a rigid frame extending rearwardly from a steering column through which passes a steering post operatively coupled to a front wheel; said frame being bifurcated to define separate branches having a free space therebetween; a pair of parallel footboards attached to said branches and extending rearwardly therefrom, said footboards having a free space therebetween which merges with the free space between the branches to create an extended space whereby regardless of where the rider stands with one foot on either footboard, he is provided with an extended free space between the footboards in which to swing his other foot to propel the scooter; and B. a rear end wheel mounted on each footboard whereby the scooter normally runs on three wheels.

* * * * *